(12) United States Patent
Craane (10) Patent No.: US 11,482,960 B2
(45) Date of Patent: Oct. 25, 2022

(54) CONTROLLING A MOTOR OF A CLOSURE AND/OR BLIND IN A VEHICLE BODY BASED ON A DISTURBANCE OBSERVER SIGNAL

(71) Applicant: Inalfa Roof Systems Group B.V., Oostrum (NL)

(72) Inventor: Dennie Wilhelmus Hendrikus Craane, Nijmegen (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 985 days.

(21) Appl. No.: 16/220,907

(22) Filed: Dec. 14, 2018

(65) Prior Publication Data
US 2019/0199258 A1 Jun. 27, 2019

(30) Foreign Application Priority Data
Dec. 22, 2017 (EP) .................................... 17210129

(51) Int. Cl.
*H02P 21/13* (2006.01)
*H02H 7/085* (2006.01)
(Continued)

(52) U.S. Cl.
CPC .............. *H02P 21/13* (2013.01); *E05F 15/40* (2015.01); *E05F 15/632* (2015.01); *G05B 19/416* (2013.01); *H02H 7/0851* (2013.01); *H02H 7/0858* (2013.01); *H02P 21/0017* (2013.01); *H02P 21/18* (2016.02); *H02P 21/22* (2016.02); *B60J 7/02* (2013.01); *E05Y 2201/438* (2013.01); *E05Y 2201/654* (2013.01);
(Continued)

(58) Field of Classification Search
CPC ....... H02P 21/13; H02P 21/0017; H02P 21/18
USPC .......................................... 318/280, 281, 282
See application file for complete search history.

(56) References Cited

U.S. PATENT DOCUMENTS 7,190,131 B2 * 3/2007 Oh ........................... H02P 6/21
  318/434
10,075,107 B2 * 9/2018 Lepka ....................... H02P 6/18
2003/0051555 A1   3/2003 Fukumura et al.

FOREIGN PATENT DOCUMENTS

CN  102393867 A   3/2012

OTHER PUBLICATIONS

European Search Report dated Jul. 11, 2018, for corresponding European Patent Application No. 17210129.7, filed Dec. 22, 2017.
(Continued)

*Primary Examiner* — David Luo
(74) *Attorney, Agent, or Firm* — Steven M. Koehler; Westman, Champlin & Koehler, P.A.

(57) ABSTRACT

A controller for controlling a motor of a closure and/or blind in a vehicle body is configured to determine a reference state signal comprising speed and/or current measurements, repeatedly estimate motor model parameters of the motor, determine an estimated state signal based on an input signal comprising measurements or estimates of a voltage, the estimated motor model parameters, the reference state signal and an error signal, the error signal representing a difference between the reference state signal and the estimated state signal, determine a disturbance observer signal from the error signal, compute a first derivative of the disturbance observer signal at a present moment, and reverse the motor upon determining that the first derivative of the disturbance observer signal exceeds a threshold.

19 Claims, 9 Drawing Sheets

(51) Int. Cl.
  E05F 15/40   (2015.01)
  E05F 15/632  (2015.01)
  H02P 21/18   (2016.01)
  H02P 21/22   (2016.01)
  G05B 19/416  (2006.01)
  H02P 21/00   (2016.01)
  B60J 7/02    (2006.01)

(52) U.S. Cl.
  CPC ....... *E05Y 2400/33* (2013.01); *E05Y 2400/44* (2013.01); *E05Y 2900/542* (2013.01); *G05B 2219/41329* (2013.01)

(56) References Cited

OTHER PUBLICATIONS

Yingjie Zhang et al., "Study on Electric Sunroof Detection of Cars Based on Model Reference Adaptive Cholesky Decomposition Filter", published in IEEE Transactions on Transportation Electrification issue 99, Sep. 21, 2017.

Ata Sevinc, "A Full Adaptive Observer for DC Servo Motors", published in Turk J Elec Engin, vol. 11, No. 2, 2003.

M. Ruderman et al., "Optimal State Space Control of DC Motor", Proceedings of the 17th World Congress of the International Federation of Automatic Control, vol. 17, No. 1, pp. 5796-5801, 2008.

\* cited by examiner

151. $\dot{\hat{x}} = A_m \hat{x} + (\hat{A} - A_m)x + \hat{B}u + \hat{W}$

152. $e = x - \hat{x}$

153. $\dot{\hat{x}} = -eA_m + \hat{A}x + \hat{B}u + \hat{W}$

154. $\dot{\hat{A}} = \gamma_1 e \hat{x}^\mathsf{T}$

155. $\dot{\hat{B}} = \gamma_2 e u^\mathsf{T}$

156. $\dot{\hat{W}} = \gamma_3 e$

157. $A_0 = \begin{bmatrix} -B/J & K_t/J \\ -K_e/L_a & -R_a/L_a \end{bmatrix}$

158. $B_0 = \begin{bmatrix} 0 \\ 1/L_a \end{bmatrix}$

159. $A_m = \begin{bmatrix} -100 & 0 \\ 0 & -100 \end{bmatrix}$

CONTROLLING A MOTOR OF A CLOSURE AND/OR BLIND IN A VEHICLE BODY BASED ON A DISTURBANCE OBSERVER SIGNAL

FIELD OF THE INVENTION

An aspect of the invention relates to a controller for controlling a motor of a closure and/or blind in a vehicle body and an open roof construction comprising such a controller.

An aspect of the invention further relates to a method of controlling a motor of a closure and/or blind in a vehicle body.

An aspect of the invention also relates to a computer program product enabling a computer system to perform such a method.

BACKGROUND OF THE INVENTION

The discussion below is merely provided for general background information and is not intended to be used as an aid in determining the scope of the claimed subject matter.

Pinch detection, also referred to as trap detection, is mandatory for open roof constructions in many countries. In the European Union, requirements applying to power-operated windows/roof-panel systems/partition systems to minimize the possibility of injuries caused by accidental or improper operation are listed in Directive 2000/4/EC. Often, open roof constructions are fitted with an auto-reversing device. Directive 2000/4/EC specifies, amongst others, that this auto-reversing device shall reverse the window/roof panel/partition before it exerts a pinch force of more than 100 N within the opening of 200 mm to 4 mm above the top edge of a power-operated window/partition or in front of the leading edge of a sliding roof panel and at the trailing edge of a tilting roof panel.

Similar requirements are specified in the United States in Federal Motor Vehicle Safety Standard No. 118. S5.1 of this standard specifies that while closing, the power-operated window, partition, or roof panel shall stop and reverse direction either before contacting a test rod with properties described in S8.2 or S8.3, or before exerting a squeezing force of 100 newtons (N) or more on a semi-rigid cylindrical test rod with the properties described in S8.1, when such test rod is placed through the window, partition, or roof panel opening at any location in the manner described in the applicable test under S7.

The paper "Study on Electric Sunroof Pinch Detection of Cars Based on Model Reference Adaptive Cholesky Decomposition Filter" by Yingjie Zhang et al., published in IEEE Transactions on Transportation Electrification issue 99 on 21 Sep. 2017, describes an electric sunroof pinch detection algorithm for cars based on a model reference adaptive cholesky decomposition filter. The model reference method and sliding-fading grey prediction theory are used to estimate noise variances more accurately. The cholesky decomposition is used to avoid filter divergence. The anti-pinch function takes effect when an estimated torque is greater than a threshold.

An advantage of this algorithm is that no reference field is used, which results in a limited calibration time during development and production of the auto-reversing device. A drawback of this algorithm is that the behavior of the roof is reflected strongly in the pinch torque signal, which is especially a problem during high disturbance operation. This is expected to make it impossible to meet all the above-mentioned requirements with regard to auto-reversing devices for open roof constructions.

SUMMARY OF THE INVENTION

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

According to an aspect of the invention, a controller for controlling a motor of a closure and/or blind in a vehicle body comprises at least one processor configured to determine a reference state signal comprising measurements of at least one of a speed of a rotor of said motor and a current supplied to said rotor, repeatedly estimate motor model parameters of said motor, determine an estimated state signal based on an input signal comprising measurements or estimates of a voltage supplied to said rotor, said estimated motor model parameters, said reference state signal and an error signal, said error signal representing a difference between said reference state signal and said estimated state signal, determine a disturbance observer signal from said error signal, compute a first derivative of said disturbance observer signal at a present moment, detect an undesired obstruction in the path of said closure and/or blind driven by said motor if said first derivative of said disturbance observer signal exceeds a threshold, and reverse said rotor of said motor upon detecting said obstruction.

Said controller may be part of a closure system like an open roof construction, for example. Said at least one processor may be configured to repeatedly estimate said motor model parameters of said motor based on said input signal, said error signal, said reference state signal and said estimated state signal. If the reference state signal does not comprise measurements of the current supplied to the rotor, the reference state signal comprises estimates of the current supplied to the rotor. If the reference state signal does not comprise measurements of the speed of the rotor, the reference state signal comprises estimates of the speed of the rotor.

Said at least one processor may be configured to compute an absolute value of said first derivative of said disturbance observer signal at said present moment and detect said undesired obstruction if said absolute value is higher than a threshold. Said at least one processor may be configured to detect said undesired obstruction if said first derivative of said disturbance observer signal is higher than a positive threshold or lower than a negative threshold.

The inventor has recognized that by using an adapted state observer to estimate motor model parameters and a disturbance observer signal and by reversing the motor if a first derivative of the disturbance observer signal exceeds a threshold, pinching is detected from a signal in which the behavior of the roof is not strongly reflected and detected in a manner that allows the pinching to be detected quickly. This allows the current requirements with regard to auto-reversing devices as specified by the European Union and United States to be met.

Furthermore, aspects of the invention can have as additional advantages:

Since no reference field is used, there is a limited calibration time during development and production of the auto-reversing device, which is also known from the prior art.

Due to absence of a reference field, no initialization/calibration is needed, which is beneficial in case remote software update is required.

No memory is needed to store the reference field.

The pinch detection adapts quickly to environmental changes. For example, temperature and humidity variations have less influences.

Less influences in production spread, such as variating tolerances of mechanical parts and electric motors.

Less force build-up is needed for detection, resulting in faster reaction times to meet the legal requirements for pinch detection.

The number of sensors that is needed in the implementation is limited, e.g. voltage plus rotor speed and/or current measurements are sufficient.

Said at least one processor may be configured to determine a first disturbance observer signal from said error signal, determine a second disturbance observer signal from said first disturbance observer signal by applying one or more filters and subsequently compute said first derivative of said second disturbance observer signal at said present moment, said one or more filters attenuating or rejecting signals with a frequency below a first frequency or above a second frequency. The one or more filters attenuating or rejecting signals with a frequency below a first frequency or above a second frequency may comprise a band-pass filter or a combination of a low-pass and a high-pass filter in series, for example. These one or more filters ensure that the behavior of the roof is reflected even less in the second disturbance observer signal. Low bandwidth information, e.g. below 10 Hz, is less relevant for pinch detection, i.e. for the disturbance observer signal, because it is mostly produced by internal dynamical effects, as the motor model parameters are normally only slowly time-varying.

Said one or more filters may attenuate or reject signals with a frequency below 0.1 Hz or even below 0.5 Hz, for example. Said one or more filters may attenuate or reject signals with a frequency above 500 Hz or even above 250 Hz, for example. This has been found to result in a good decoupling of pinch detection from normal roof behavior.

Said at least one processor may be configured to determine a second error signal from a first error signal by applying a low-pass filter and determine said estimated state signal based on said input signal, said estimated motor model parameters, said reference state signal and said second error signal, said first and second error signals each representing a difference between said reference state signal and said estimated state signal, said low-pass filter attenuating or rejecting signals with a frequency above a certain frequency. Low bandwidth information is relevant for estimating the motor model parameters and is therefore used for this purpose. Higher bandwidth information is typically not required to estimate the motor model parameters. The low-pass filter may attenuate or reject signals with a frequency above 10 Hz, for example. The low-pass filter may attenuate or reject signals with a frequency above the certain frequency and pass signals with a frequency below the certain frequency, for example. The above-mentioned one or more filters may attenuate or reject signals with a frequency below the same certain frequency.

The controller may be part of a closure system and/or a blind system in a vehicle body. Such a closure system may close or at least partially open an opening in the vehicle body. For instance, the closure system may be a so-called open roof system capable of closing and opening an aperture in the roof of the vehicle body. Another example of a closure system may be a movable window in a vehicle door or a sliding door in a vehicle body or even a tailgate closure, all of which are capable of moving by means of an electric motor being controlled by the controller. The blind system may be a flexible screen type such as a rollo or a solid screen such as a so-called sun shade. The blind system typically extends adjacent to a transparent closure such as a movable panel of an open roof construction or a movable window on the interior side of the vehicle body.

According to an aspect of the invention, a method of controlling a motor of a closure and/or blind in a vehicle body comprises determining a reference state signal comprising measurements of at least one of a speed of a rotor of said motor and a current supplied to said rotor, repeatedly estimating motor model parameters of said motor, determining an estimated state signal based on an input signal comprising measurements or estimates of a voltage supplied to said rotor, said estimated motor model parameters, said reference state signal and an error signal, said error signal representing a difference between said reference state signal and said estimated state signal, determining a disturbance observer signal from said error signal, computing a first derivative of said disturbance observer signal at a present moment, detecting an undesired obstruction in the path of said closure and/or blind driven by said motor if said first derivative of said disturbance observer signal exceeds a threshold, and reversing said rotor of said motor upon detecting said obstruction. Said method may be performed by software running on a programmable device. This software may be provided as a computer program product.

Determining said disturbance observer signal from said error signal and computing said first derivative of said disturbance observer signal at said present moment may comprise determining a first disturbance observer signal from said error signal, determining a second disturbance observer signal from said first disturbance observer signal by applying one or more filters, said one or more filters attenuating or rejecting signals with a frequency below a first frequency or above a second frequency, and computing said first derivative of said second disturbance observer signal at said present moment.

Determining said estimated state signal based on said input signal, said estimated motor model parameters, said reference state signal and said error signal may comprises determining a second error signal from a first error signal by applying a low-pass filter, said first and second error signals each representing a difference between said reference state signal and said estimated state signal, and determining said estimated state signal based on said input signal, said estimated motor model parameters, said reference state signal and said second error signal, said low-pass filter attenuating or rejecting signals with a frequency above a certain frequency.

Said one or more filters may attenuate or reject signals with a frequency below 0.1 Hz or above 500 Hz and/or said low-pass filter may attenuate or reject signals with a frequency above 10 Hz.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least a first software code portion, the first software code portion, when executed or processed by a computer, being configured to perform executable operations comprising: determining a reference state signal comprising measurements of at least one of a speed of a rotor of said motor and a current supplied to said rotor, repeatedly estimating motor model parameters of said motor, determining an estimated state signal based on an input signal comprising measurements or estimates of a voltage supplied to said rotor, said estimated motor model parameters, said reference state signal and an error signal, said error signal representing a difference between said reference state signal and said estimated state signal, determining a disturbance observer signal from said error signal, computing a first derivative of said disturbance observer signal at a present moment, detecting an undesired obstruction in the path of said closure and/or blind driven by said motor if said first derivative of said disturbance observer signal exceeds a threshold, and reversing said rotor of said motor upon detecting said obstruction.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages.

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
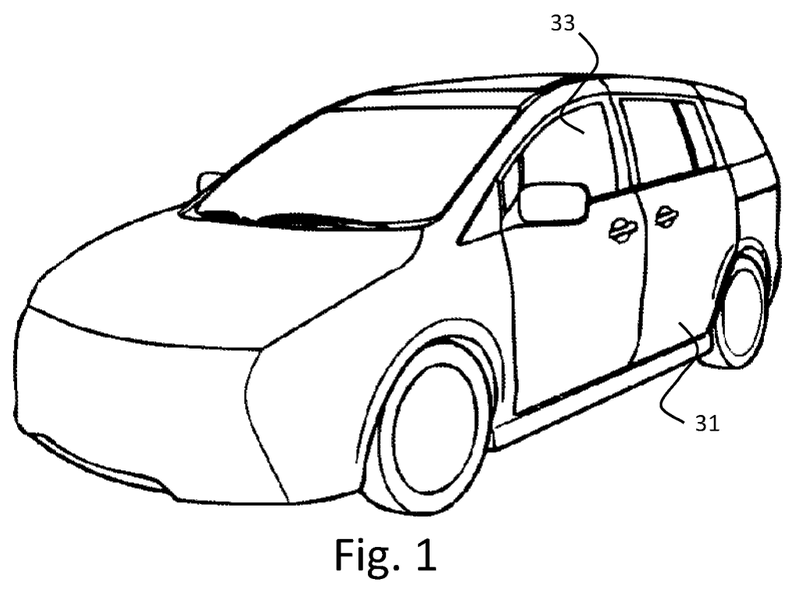
FIG. 1 is an isometric view of a car with a slide door construction and side window construction as viewed from the front.
Figure 2:
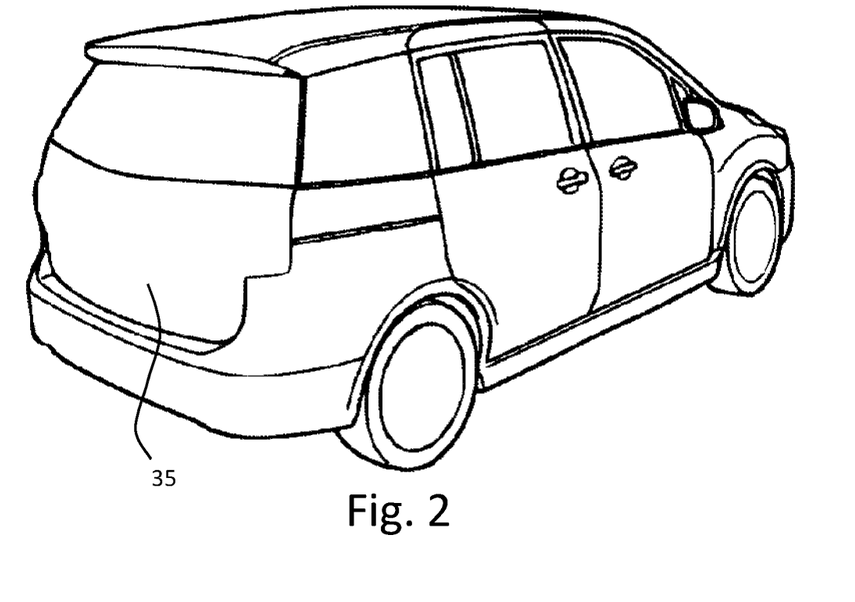
FIG. 2 is an isometric view of the car of FIG. 1 as viewed from the back showing a tailgate construction.

FIG. 1 shows a car as viewed from the front, including a slide door construction 31 and a side window construction 33. FIG. 2 shows the car of FIG. 1 as viewed from the back, including the slide door and side window constructions 31 and 33 shown in FIG. 1 and a tailgate construction 35. The closure systems 31, 33 and 35 shown in these figures comprise a control module, a motor and a closure. The different closure systems typically use different motors, but may use the same control module with different processors, for example. The closure and/or blind system can be used for other purposes than for opening side windows, side doors or tailgates, e.g. for opening roofs or blinds.

Figure 3:
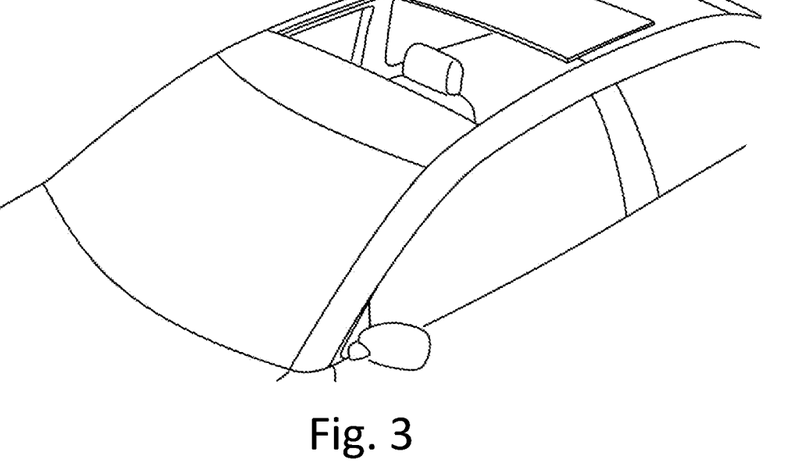
FIG. 3 is an isometric view of a car with an open roof construction.
Figure 4:
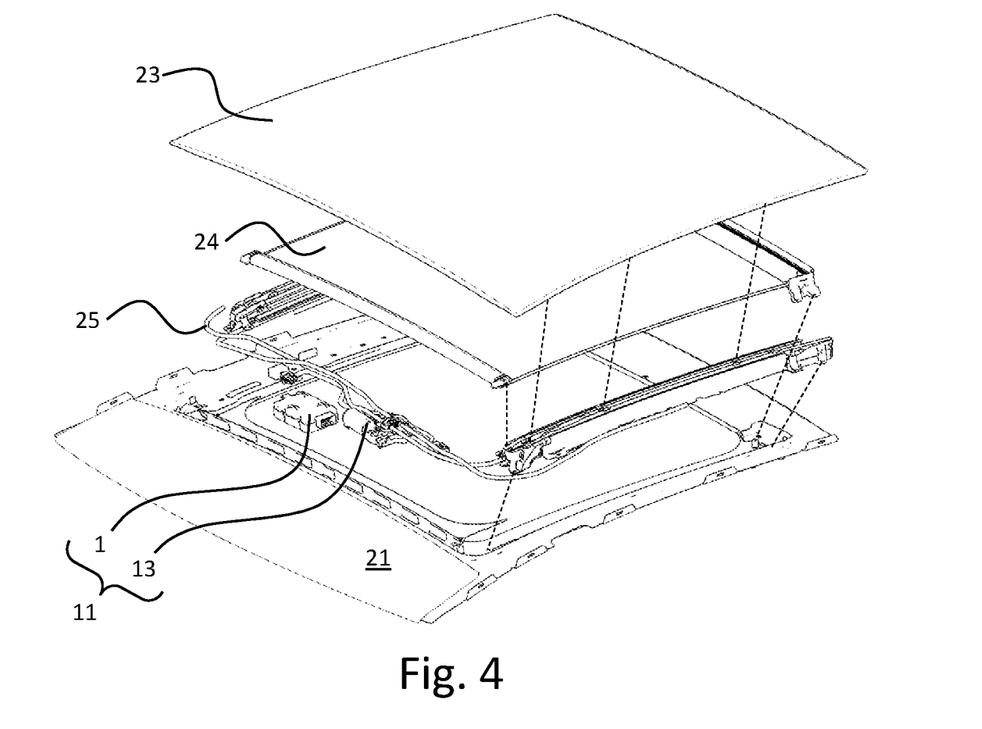
FIG. 4 shows an embodiment of the open roof construction of the invention.

FIG. 3 shows a car with a preferred embodiment of the open roof construction in which a roof has been opened by moving a moveable panel. FIG. 4 shows an exploded view of this open roof construction. The open roof construction 21 comprises a roof control system 11, a moveable panel 23 and cabling 25 for moving the panel 23, and a blind 24 extending below the movable panel 23. The roof control system 11 comprises a motor 13 and a controller 1 (an embodiment of the controller).

The direction of the rotor of the motor 13 determines in which direction the cabling 25 is pulled, which determines the direction in which the panel 23 moves. The cabling 25 can be used to let the panel 23 move vertically in addition to horizontally. In FIG. 4, the controller 1 is located next to the motor 13. In an alternative embodiment, the controller 1 may be located elsewhere, e.g. in the overhead console or as a clip-on on the motor 13.

Figure 5:
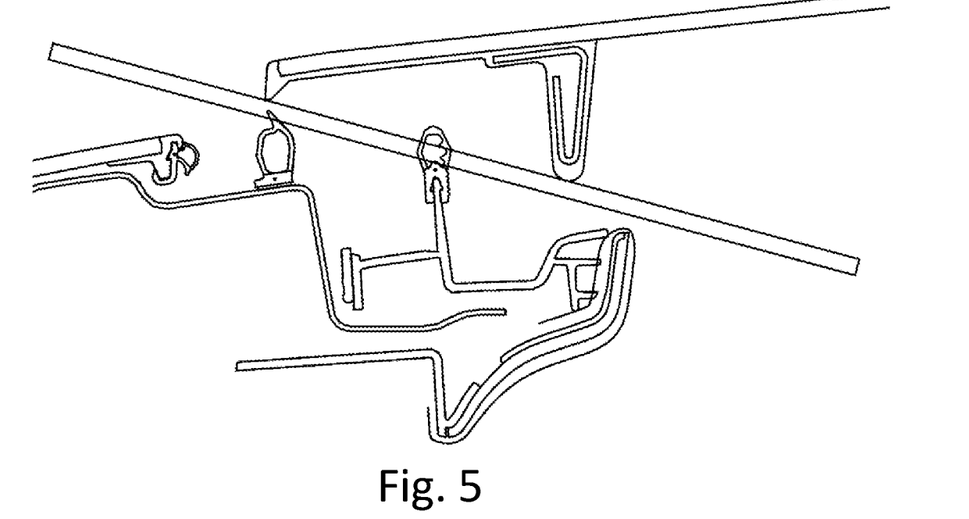
FIG. 5 is a sectional view of a rod pinched between a moveable panel and a fixed roof part.

FIG. 5 illustrates how a pinch situation may occur in practice. A rod is shown, resembling a human body part, which is pinched between a moveable (glass) panel and a bulb seal of a fixed part of the open roof construction. The bottom of the fixed part of the open roof construction, i.e. the bottom of FIG. 5, is above the normal position of a driver's head. The panel would need to move to the left and down in order to close the roof, but cannot due to the rod obstructing its way. The force applied to the rod (i.e. the human body part) should stay below 100 newtons (N) according to current requirements.

Figure 6:
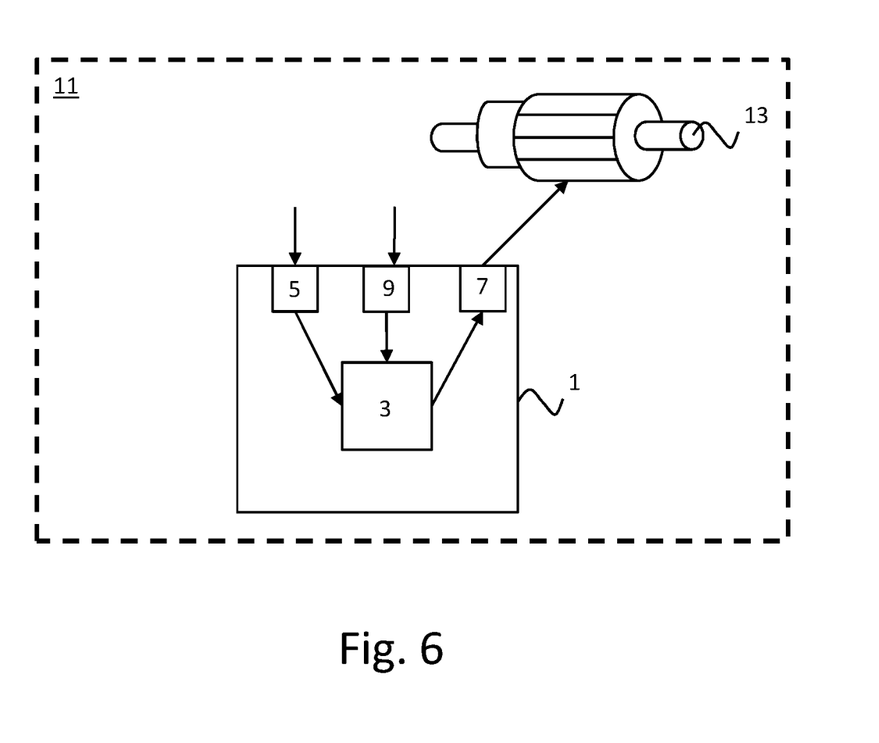
FIG. 6 is a block diagram of an embodiment of the controller of the invention.

FIG. 6 depicts an embodiment of the controller. In this embodiment, the controller 1 comprises a printed circuit board on which a processor 3, an input port 5, an output port 7, and power connector 9 are installed. The power connector 9 may be coupled to a vehicle battery, for example. The processor 3 may be an Atmel ATmega8 or ATmega168 microcontroller, for example. The processor 3 is configured to use the output port 7 to control the motor 13. The processor 3 is further configured to determine a reference state signal from the input received on the input port 5, e.g. to extract sampled data from a data stream.

The reference state signal comprises measurements of a speed of a rotor of the motor 13 and/or a current supplied to the rotor of the motor 13. If the reference state signal does not comprise measurements of the current supplied to the rotor, the reference state signal comprises estimates of the current supplied to the rotor. If the reference state signal does not comprise measurements of the speed of the rotor, the reference state signal comprises estimates of the speed of the rotor.

The processor 3 may be configured to determine the input signal from the input received on the input port 5 as well. The input signal comprises measurements or estimates of a voltage supplied to the rotor of the motor 13. Either a single value or multiples values representing the voltage supplied to the rotor may be received on the input port 5. Alternatively, the voltage supplied to the rotor may be configured/programmed in the processor 3. If the reference state signal does not comprise measurements of the current supplied to the rotor of the motor, the current supplied to the rotor of the motor may be computed from the speed of the rotor and the voltage supplied to the rotor. In an alternative embodiment, multiple processors may be used instead of a single processor. For instance, a first processor may be subjected to control the motor for the movable panel whereas a second processor may control the motor for the blind.

The controller 1 may be used in other constructions than roof constructions. For example, the controller 1 may be used to control a motor of a closure (e.g. a movable window) and/or blind in a side door, slide door or tailgate of a vehicle body.

In order to detect an undesired obstruction in the path of the closure and/or blind driven by the motor 13 without relying on a reference field, a state observer, known from control theory, may be used as a starting point. An important principle of a state observer is that the difference between the actual and predicted outputs is used, i.e. fed back into the system. Similarly, if at least one of the parameters of the internal state of the system is measured, the difference between the actual and predicted internal state may be used, i.e. fed back into the system. An example of this is described in the paper "A Full Adaptive Observer for DC Servo Motors" by Ata Sevinç, published in Turk J Elec Engin, VOL. 11, NO. 2 2003.

Figure 7:
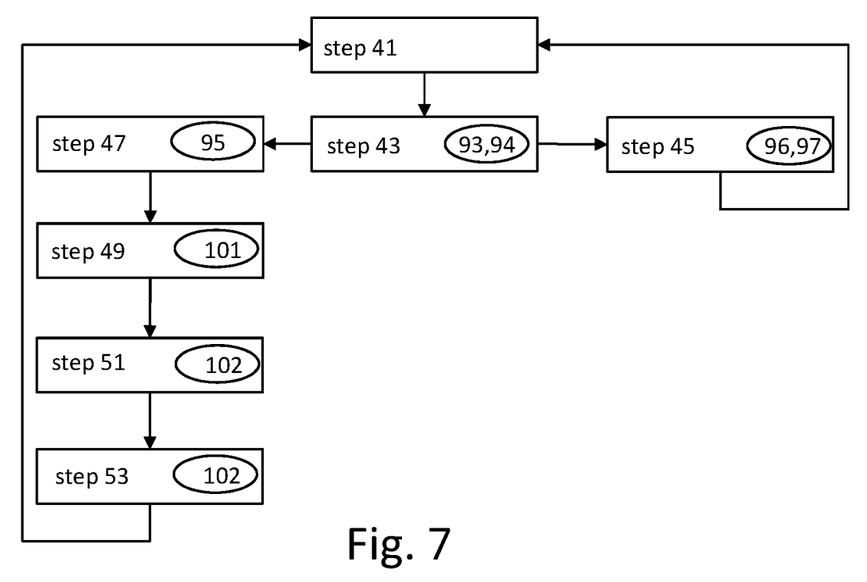
FIG. 7 is a flow diagram of a first embodiment of the method of the invention.
Figure 8:
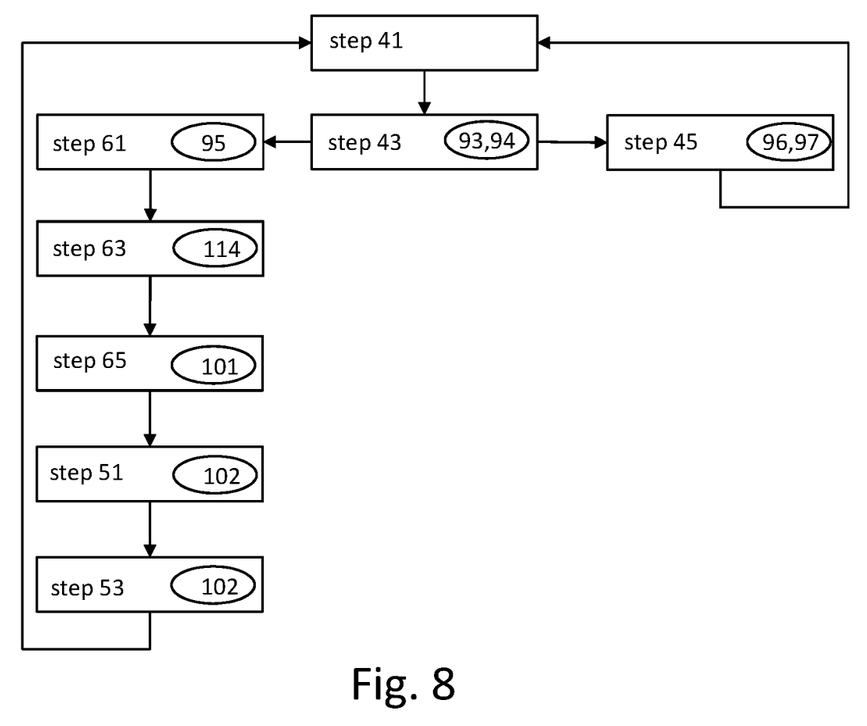
FIG. 8 is a flow diagram of a second embodiment of the method of the invention.

The controller 1 may be programmed to perform the method shown in FIG. 7. In the embodiment of the method shown in FIG. 7, the difference between the afore-mentioned reference state signal and an estimated state signal is fed back into the system in what will be referred to as an "error signal". In FIGS. 7 and 8, the numbers shown in the ovals refer to reference numerals of blocks depicted in FIGS. 9 to 11. A block identified in a step (rectangle) is used to carry out this step in the mathematical models represented in FIGS. 9 to 11. These blocks will be described later in this specification in the description of FIGS. 9 to 11.

A step 41 comprises determining a reference state signal comprising measurements of at least one of a speed of a rotor of the motor and a current supplied to the rotor. A step 43 comprises repeatedly estimating motor model parameters of the motor. A step 45 comprises determining an estimated state signal based on an input signal comprising measurements or estimates of a voltage supplied to the rotor, the estimated motor model parameters, the reference state signal and an error signal. As mentioned above, the error signal represents the difference between the reference state signal and the estimated state signal.

A step 47 comprises determining a disturbance observer signal from the error signal. A step 49 comprises computing a first derivative of the disturbance observer signal at a present moment. A step 51 comprises detecting an undesired obstruction in the path of the closure and/or blind driven by the motor if the first derivative of the disturbance observer signal exceeds a threshold. A step 53 comprises reversing the rotor of the motor upon detecting the obstruction. These steps will be described in more detail in relation to FIG. 9.

The embodiment of the method shown in FIG. 8 has been extended compared to the embodiment shown in FIG. 7. Steps 47 and 49 have been replaced with steps 61, 63 and 65. Step 61 comprises determining a first disturbance observer signal from the error signal. Step 63 comprises determining a second disturbance observer signal from the first disturbance observer signal by applying one or more filters. The one or more filters attenuate or reject signals with a frequency below a first frequency, e.g. below 0.1 Hz (or even below 0.5 Hz), or above a second frequency, e.g. above 500 Hz (or even above 250 Hz). Step 65 comprises computing the first derivative of the second disturbance observer signal at the present moment. These steps will be described in more detail in relation to FIG. 10.

The software that allows the processor 3 of the controller 1 shown in FIG. 6 to perform the method may be developed by first creating a mathematical model and then automatically generating C code from the mathematical model, for example. The generated C code may be optimized for the specific type of processor being used. A high-level representation of a first mathematical model is shown in FIG. 9.

The goal of programming a controller to perform the method of FIG. 7 is to configure at least one processor to determine a reference state signal 82 comprising measurements of at least one of a speed of a rotor of the motor and a current supplied to the rotor (the reference state signal 82 must comprise either measurements of both a speed of the rotor and a current supplied to the rotor or a combination of a measurement of one of the speed of the rotor and the current supplied to the rotor and an estimate of the other one of the speed of the rotor and the current supplied to the rotor), repeatedly estimate motor model parameters of the motor, determine an estimated state signal 84 based on an input signal 81 comprising measurements or estimates of a voltage supplied to the rotor, the estimated motor model parameters, the reference state signal 82 and an error signal 83 (which represents a difference between the reference state signal 82 and the estimated state signal 84), determine a disturbance observer signal 85 from the error signal 83, compute a first derivative of the disturbance observer signal 85 at a present moment, detect an undesired obstruction in the path of the closure and/or blind driven by the motor if the first derivative of the disturbance observer signal 85 exceeds a threshold, and reverse the rotor of the motor upon detecting the obstruction. This is reflected in the representation of FIG. 9.

Figure 9:
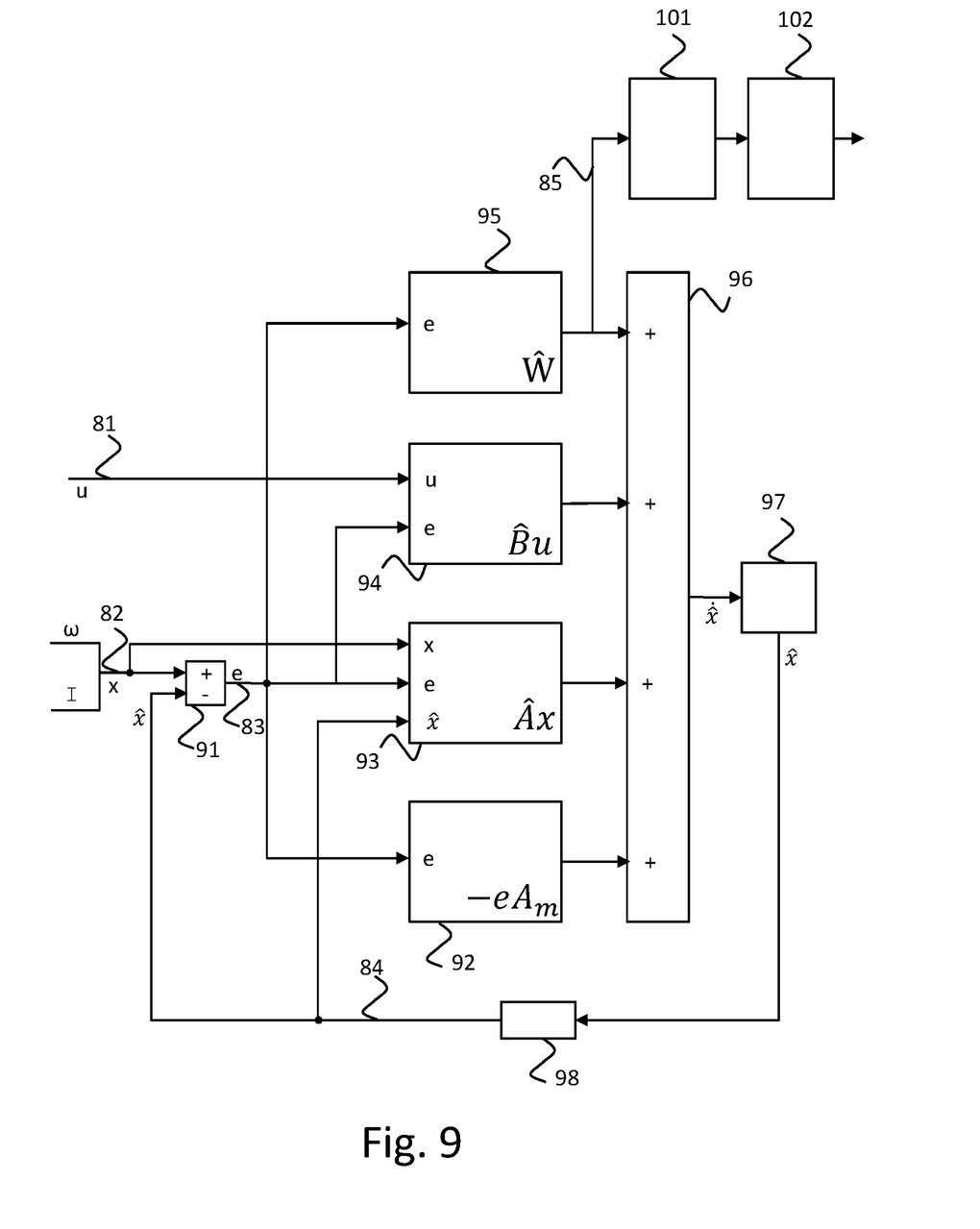
FIG. 9 depicts a first embodiment of digital signal processing carried out by an embodiment of the controller.

Typically, the at least one processor is configured to repeatedly estimate the motor model parameters of the motor based on the input signal 81, the error signal 83, the reference state signal 82 and the estimated state signal 84, as also reflected in the representation of FIG. 9.

The behavior of the controller may be modeled as a system. The state-space model representation of a linear system can assume the following form:

$$\dot{x}=Ax+Bu$$

$$y=Cx+Du$$

x represents the internal state signal. u represents the input signal. y represents the output signal. A, B, C and D are normally predetermined matrices. These equations are typically used to infer the internal state signal based on known input and output signals. In the model represented in FIG. 9, the output signal y is not modeled, but instead, known input and internal state signals are used to estimate matrices A and B, amongst others.

Figure 12:
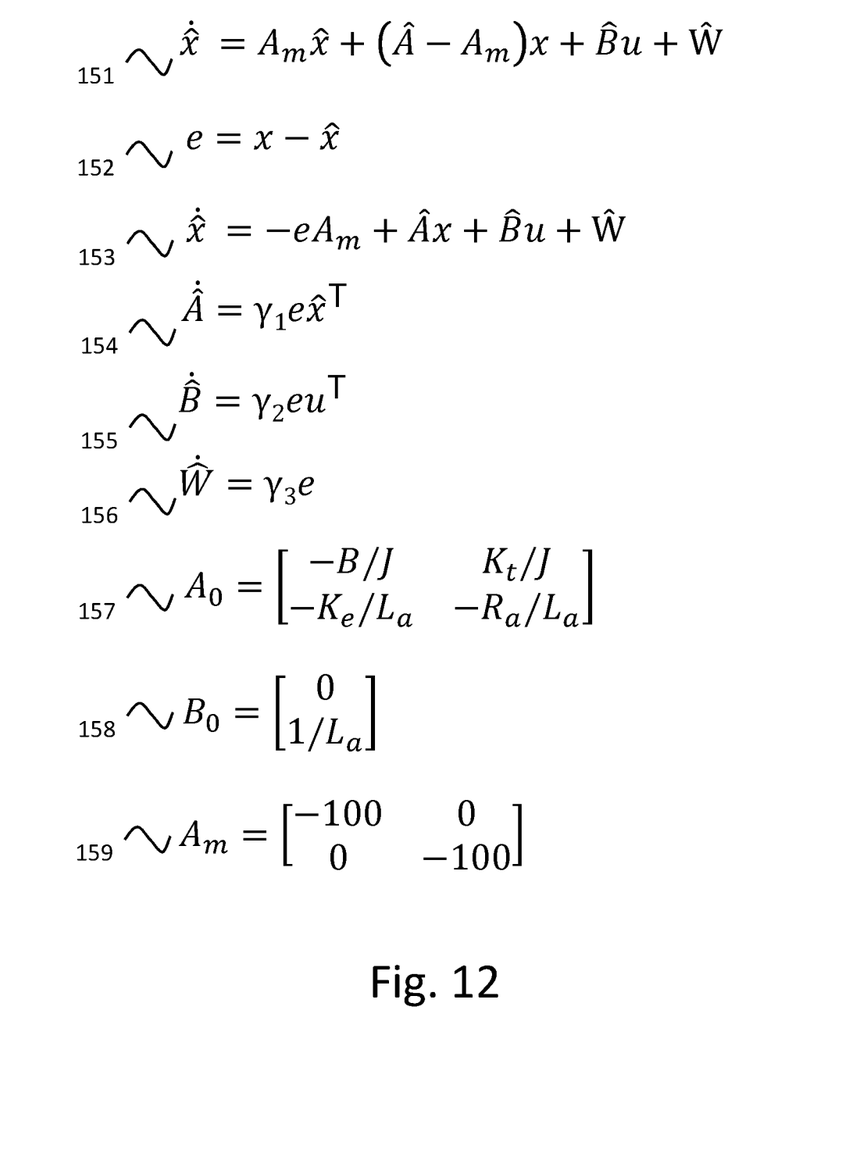
FIG. 12 provides equations corresponding to the embodiments of FIGS. 9 to 11.

The inventor has found that the following equation (equation 151 of FIG. 12) is beneficial for modeling the digital signal processing to be performed by the controller:

$$\dot{\hat{x}}=A_m\hat{x}+(\hat{A}-A_m)x+\hat{B}u+\hat{W}$$

State observer theory has been applied to form the above equation. $\hat{x}$ represents the estimated state signal, while x represents the (known) reference state signal. x comprises a vector $$\begin{bmatrix}\omega\\I\end{bmatrix}$$

in which ω represents rotor speed and I represents the armature current. u is equal to Ub, which represents the supply voltage. $\hat{A}$ and $\hat{B}$ represent estimates of matrices A and B, which comprise motor model parameters. $\hat{W}$ represents a disturbance observer. $A_m$ has been defined as follows (see also equation 159 of FIG. 12):

$$A_m=\begin{bmatrix}-100 & 0\\0 & -100\end{bmatrix}$$

The difference between the reference state signal (x) and the estimated state signal ($\hat{x}$) can be defined as error (signal) e (see also equation 152 of FIG. 12):

$$e=x-\hat{x}$$

The error signal is determined in block 91 of FIG. 9. Furthermore, rewriting equation 151 of FIG. 12 results in the following equation (equation 153 of FIG. 12):

$$\dot{\hat{x}}=-eA_m+\hat{A}x+\hat{B}u+\hat{W}$$

The first term ($-eA_m$) is represented by block 92 in FIG. 9. The second term ($\hat{A}x$) is represented by block 93 in FIG. 9. The third term ($\hat{B}u$) is represented by block 94. The fourth term ($\hat{W}$) is represented by block 95. The summation of the four terms is represented by block 96. Block 97 represents the integration of $\dot{\hat{x}}$ over time, which results in $\hat{x}$. Block 98 represents a unit delay and allows e(k) to be determined as x(k)−$\hat{x}$(k−1).

The inventor has further determined that $\hat{A}$, $\hat{B}$ and $\hat{W}$ may be computed with the following equations (shown as equations 154, 155 and 156 in FIG. 12):

$$\dot{\hat{A}} = \gamma 1 e \hat{x}^T$$

$$\dot{\hat{B}} = \gamma 2 e u^T$$

$$\dot{\hat{W}} = \gamma 3 e$$

In order determine $\hat{A}$ and $\hat{B}$ from $\dot{\hat{A}}$ and $\dot{\hat{B}}$, initial values for A and B need to be defined. These initial values $A_0$ and $B_0$ may be the same as the values for A and B that are regularly used to model a DC motor in a state space representation (see also equations 157 and 158 of FIG. 12):

$$A_0 = \begin{bmatrix} -B/J & K_t/J \\ -K_e/L_a & -R_a/L_a \end{bmatrix}$$

$$B_0 = \begin{bmatrix} 0 \\ 1/L_a \end{bmatrix}$$

B and J are the internal friction and inertia of the motor, respectively. $R_a$ and $L_a$ are the armature resistance and inductance, respectively. $K_e$ and $K_t$ are motor constants. $K_e$ defines the linear relationship between ω and $U_{cmf}$: $U_{cmf} = K_e \omega$, in which $U_{cmf}$ is the electromotive force voltage. $K_t$ defines the linear relationship between armature current and motor torque: $T_m = K_t I$. This high level motor model is described in more detail in "Optimal State Space Control of DC Motor", M. Ruderman et al., Proceedings of the 17th World Congress of the International Federation of Automatic Control, vol. 17, no. 1, pp. 5796-5801, 2008.

After the disturbance observer signal 85 ($\hat{W}$) has been determined in block 95, the absolute value of the first derivative of the disturbance observer signal 85 ($\hat{W}$) at the present moment is computed in block 101 and passed to block 102. In block 102, this absolute value of the first derivative is compared to a threshold. If the absolute value is determined to be higher than the threshold, it is determined that there is an obstruction and that the motor should be reversed. In an alternative embodiment, the first derivative of the disturbance observer signal 85 is compared to both a positive threshold and a negative threshold. If the first derivative of the disturbance observer signal 85 is determined to be higher than the positive threshold or lower than the negative threshold, it is determined that there is an obstruction and that the motor should be reversed. Preferably, the absolute values of the positive threshold and the negative threshold are similar or the same.

The threshold is typically determined individually for each vehicle type, e.g. based on test results. In an embodiment, the threshold is set 30% higher than the average evaluation value. In certain situations, an obstruction may be determined not to have taken place despite the threshold being exceeded or pinch detection may be disabled, e.g. during startup of the roof control module. The threshold may be adjusted automatically during operation, e.g. the threshold may be increased in open direction or when voltage increases.

Figure 10:
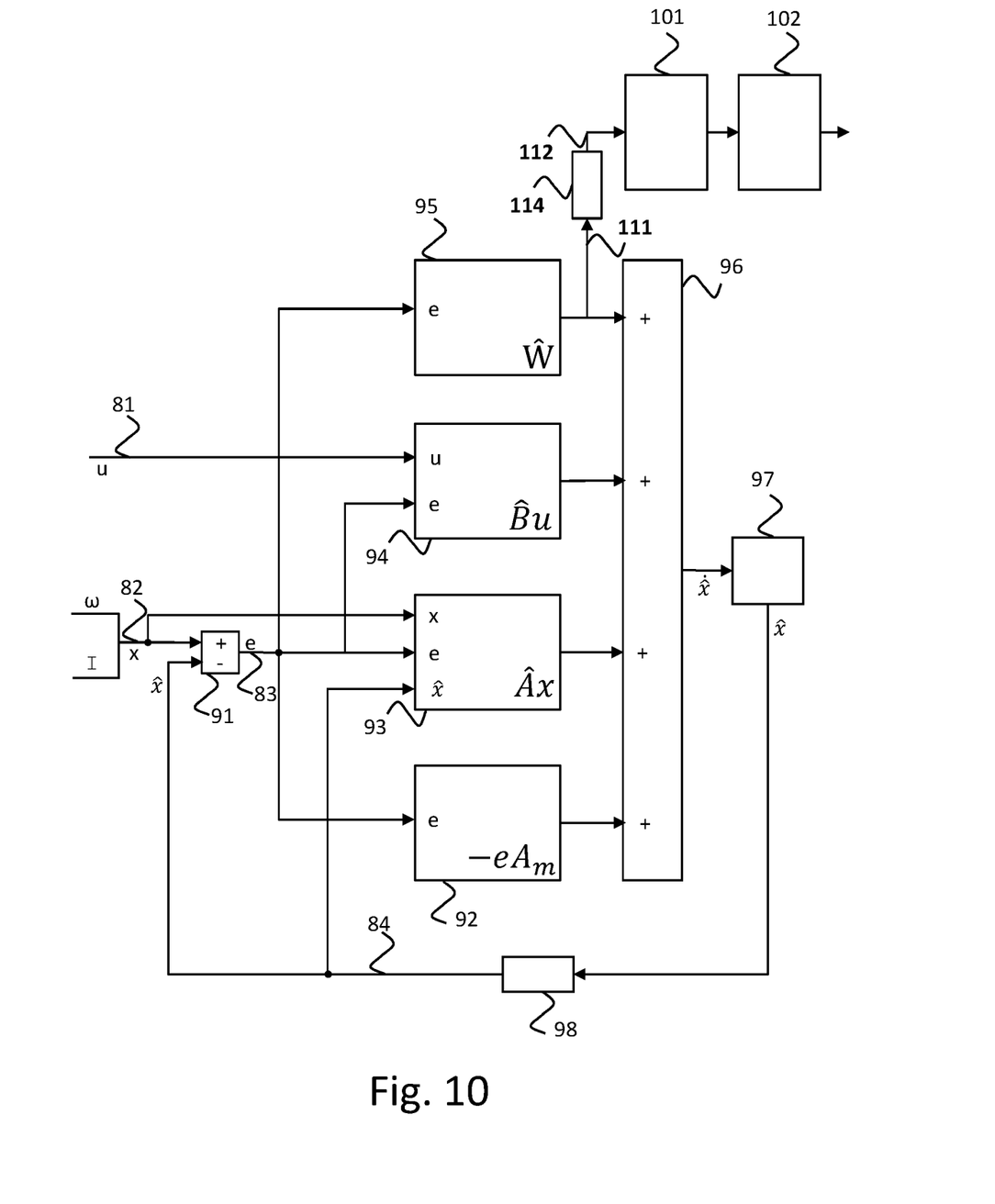
FIG. 10 depicts a second embodiment of digital signal processing carried out by an embodiment of the controller.

FIG. 10 shows a high-level representation of a second mathematical model, which is an extension of the first mathematical model of FIG. 9. Converting this mathematical model into C code results in the at least one processor being programmed differently. In this embodiment, the at least one processor is configured to determine a first disturbance observer signal 111 from the error signal 83 (in block 95), determine a second disturbance observer signal 112 from the first disturbance observer 111 signal by applying one or more filters (e.g. a band-pass filter) 114 and subsequently compute the first derivative of the second disturbance observer signal 112 at the present moment, e.g. the absolute value of the first derivative. The one or more filters, e.g. one or more Butterworth filters, 114 attenuate or reject signals with a frequency below a first frequency, e.g. below 0.1 Hz (or even below 0.5 Hz), or above a second frequency, e.g. above 500 Hz (or even above 250 Hz). For example, signals with certain frequencies may be attenuated while signals with certain other frequencies are rejected. In case multiple filters 114 are applied, these filters are placed in series with regard to each other.

Figure 11:
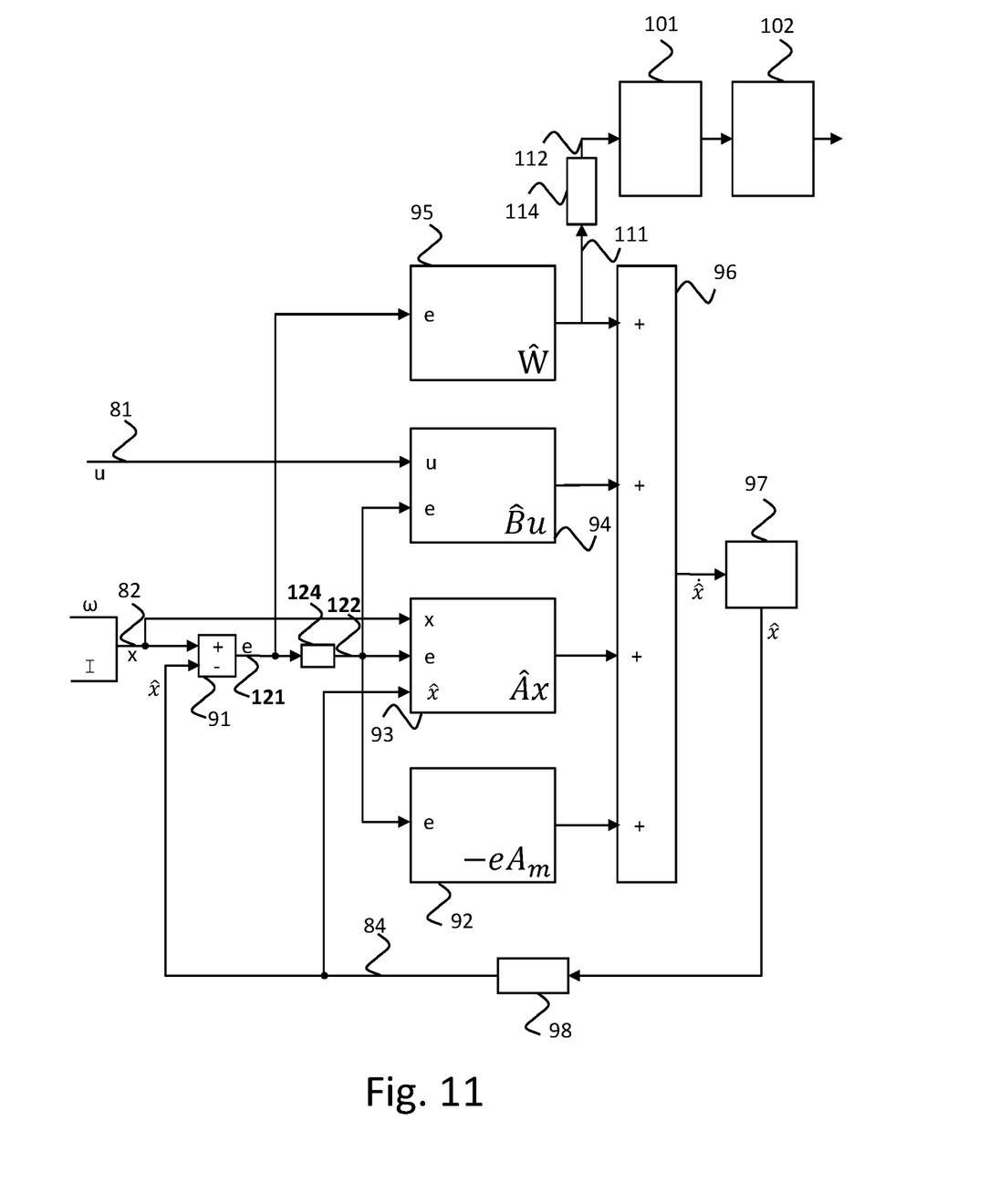
FIG. 11 depicts a third embodiment of digital signal processing carried out by an embodiment of the controller.

FIG. 11 shows a high-level representation of a third mathematical model, which is an extension of the second mathematical model of FIG. 10. Converting this mathematical model into C code results in the at least one processor being programmed differently. In this embodiment, the at least one processor is configured to determine a second error signal 122 from a first error signal 121 (determined in block 91) by applying a low-pass filter 124 and determine the estimated state signal 84 based on the second error signal 122 (in blocks 92-98). The first and second error signals 121 and 122, respectively, each represent a difference between the reference state signal 82 and the estimated state signal 84 and the low-pass filter (e.g. a Butterworth filter) 124 attenuates or rejects signals with a frequency above a certain frequency, e.g. above 10 Hz. For example, signals with certain frequencies may be attenuated while signals with certain other frequencies are rejected.

Preferably, this certain frequency is the same as the first frequency described in relation to FIG. 10, e.g. between 0.1 and 10 Hz. In the embodiment of FIG. 11, the at least one processor is configured to determine the first disturbance observer signal 111 from the first error signal 121. In an alternative embodiment, the low-pass filter 124 is added to the mathematical model represented by FIG. 9 without using the one or more filters 114 as described in relation to FIG. 10.

Figure 13:
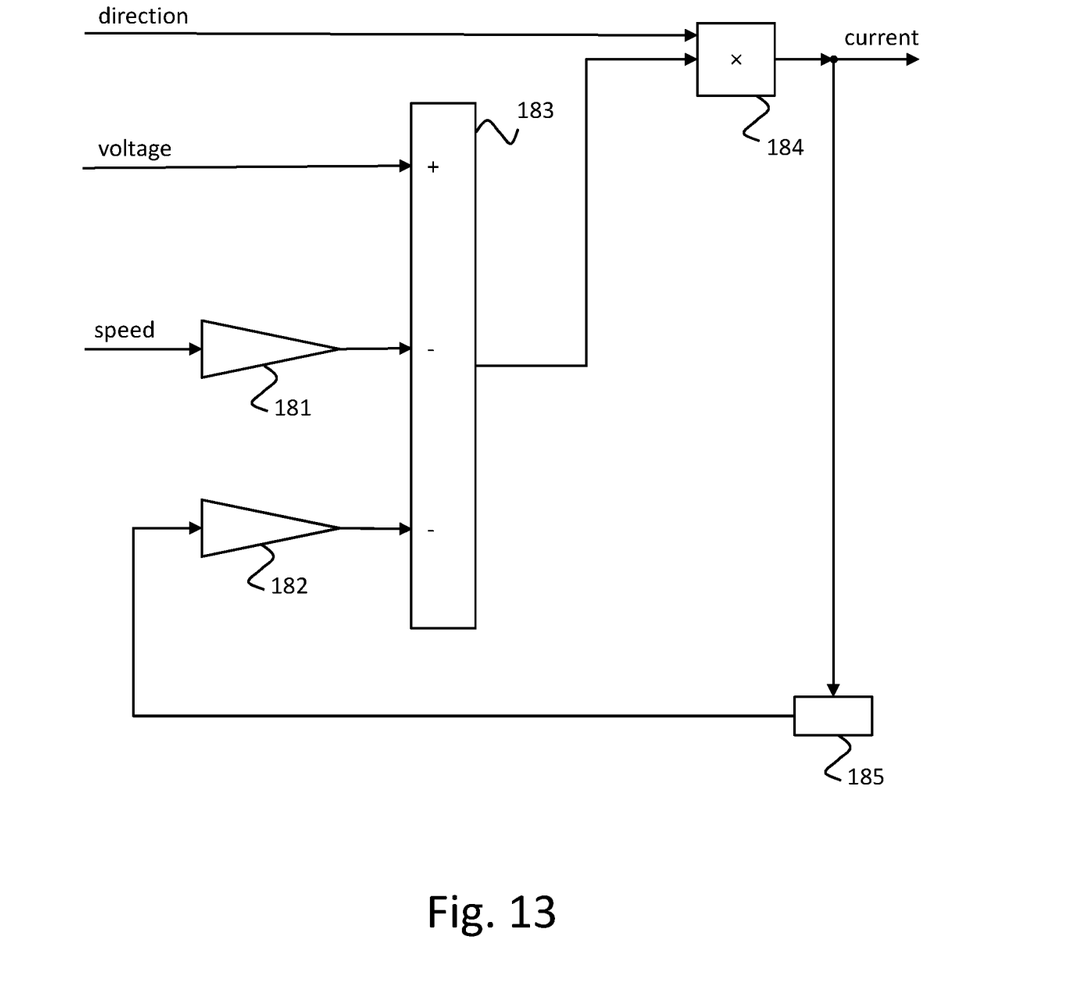
FIG. 13 depicts a digital conversion of speed and voltage signals into a current signal.

The reference state signal 82 must comprise either measurements of both a speed of the rotor and a current supplied to the rotor or a combination of a measurement of one of the speed of the rotor and the current supplied to the rotor and an estimate of the other one of the speed of the rotor and the current supplied to the rotor. If the reference state signal 82 shown in FIGS. 9 to 11 does not comprise measurements of the current supplied to the rotor of the motor, the current supplied to the rotor of the motor may be computed from the speed of the rotor and the voltage supplied to the rotor. FIG. 13 shows an example of how to compute the current supplied to the rotor of the motor from the pinion speed and the voltage supplied to the rotor. The rotor speed can be determined from the pinion speed by multiplying the pinion speed with a ratio appropriate for the motor in question.

In the example of FIG. 13, the current (mA) at time k is determined by first subtracting the pinion speed (rad/s) multiplied with constant Ke (the motor constant used in equation 157 of FIG. 8) in gain 181 and the current at time k−1 multiplied with constant Ra (the armature resistance) in gain 182 from the voltage (mV) supplied to the rotor in adder 183. The resulting value is then multiplied with the direction of the motor in multiplier 184 in order to obtain the current at time k. The current at time k is fed back to the gain 182 via unit delay 185 to allow the current to be determined at time k+1.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 3 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

What is claimed is:

1. A controller for controlling a motor of a closure and/or blind in a vehicle body, comprising at least one processor configured to:
   determine a reference state signal comprising measurements of at least one of a speed of a rotor of said motor and a current supplied to said rotor,
   repeatedly estimate motor model parameters of said motor,
   determine an estimated state signal based on an input signal comprising measurements or estimates of a voltage supplied to said rotor, said estimated motor model parameters, said reference state signal and an error signal, said error signal representing a difference between said reference state signal and said estimated state signal,
   determine a disturbance observer signal from said error signal,
   compute a first derivative of said disturbance observer signal at a present moment,
   detect an undesired obstruction in the path of said closure and/or blind driven by said motor if said first derivative of said disturbance observer signal exceeds a threshold, and
   reverse said rotor of said motor upon detecting said obstruction.

2. The controller as claimed in claim 1, wherein said at least one processor is configured to repeatedly estimate said motor model parameters of said motor based on said input signal, said error signal, said reference state signal and said estimated state signal.

3. The controller as claimed in claim 1, wherein said at least one processor is configured to determine a first disturbance observer signal from said error signal, determine a second disturbance observer signal from said first disturbance observer signal by applying one or more filters, and subsequently compute said first derivative of said second disturbance observer signal at said present moment, said one or more filters attenuating or rejecting signals with a frequency below a first frequency or above a second frequency.

4. The controller as claimed in claim 3, wherein said one or more filters attenuate or reject signals with a frequency below 0.1 Hz or above 500 Hz.

5. The controller as claimed in claim 4, wherein said one or more filters attenuate or reject signals with a frequency below 0.5 Hz or above 250 Hz.

6. The controller as claimed in claim 1, wherein said at least one processor is configured to determine a second error signal from a first error signal by applying a low-pass filter and determine said estimated state signal based on said input signal, said estimated motor model parameters, said reference state signal and said second error signal, said first and second error signals each representing a difference between said reference state signal and said estimated state signal, said low-pass filter attenuating or rejecting signals with a frequency above a certain frequency.

7. The controller as claimed in claim 6, wherein said low-pass filter attenuates or rejects signals with a frequency above 10 Hz.

8. The controller as claimed in claim 1, wherein said at least one processor is configured to compute an absolute value of said first derivative of said disturbance observer signal at said present moment and detect said undesired obstruction if said absolute value is higher than a threshold.

9. The controller as claimed in claim 1, wherein said at least one processor is configured to detect said undesired obstruction if said first derivative of said disturbance observer signal is higher than a positive threshold or lower than a negative threshold.

10. A closure and/or blind system for a vehicle body comprising the controller for controlling a motor of claim 1, said motor and a closure and/or blind driven by said motor, said motor being configured to move said closure and/or blind in said vehicle body.

11. The closure and/or blind system as claimed in claim 10, wherein said closure and/or blind system is an open roof construction and said closure comprises at least one moveable panel.

12. A method of controlling a motor of a closure and/or blind in a vehicle body, comprising:
   determining a reference state signal comprising measurements of at least one of a speed of a rotor of said motor and a current supplied to said rotor;
   repeatedly estimating motor model parameters of said motor;
   determining an estimated state signal based on an input signal comprising measurements or estimates of a voltage supplied to said rotor, said estimated motor model parameters, said reference state signal and an error signal, said error signal representing a difference between said reference state signal and said estimated state signal;
   determining a disturbance observer signal from said error signal;
   computing a first derivative of said disturbance observer signal at a present moment;
   detecting an undesired obstruction in the path of said closure and/or blind driven by said motor if said first derivative of said disturbance observer signal exceeds a threshold; and
   reversing said rotor of said motor upon detecting said obstruction.

13. The method as claimed in claim 12, wherein determining said disturbance observer signal from said error signal and computing said first derivative of said disturbance observer signal at said present moment comprises:
   determining a first disturbance observer signal from said error signal; —determining a second disturbance observer signal from said first disturbance observer signal by applying one or more filters, said one or more filters attenuating or rejecting signals with a frequency below a first frequency or above a second frequency; and
   computing said first derivative of said second disturbance observer signal at said present moment.

14. The method as claimed in claim 13, wherein said one or more filters attenuate or reject signals with a frequency below 0.1 Hz or above 500 Hz.

15. The method as claimed in claim 13, wherein said low-pass filter attenuates or rejects signals with a frequency above 10 Hz.

16. The method as claimed in claim 12, wherein determining said estimated state signal based on said input signal, said estimated motor model parameters, said reference state signal and said error signal comprises:
   determining a second error signal from a first error signal by applying a low-pass filter, said first and second error signals each representing a difference between said reference state signal and said estimated state signal; and
   determining said estimated state signal based on said input signal, said estimated motor model parameters, said reference state signal and said second error signal, said low-pass filter attenuating or rejecting signals with a frequency above a certain frequency.

17. A non-transitory, computer readable medium contains a computer program or suite of computer programs comprising at least one software code portion or a computer program product storing at least one software code portion, the software code portion, when run on a computer system, being configured for performing a method of controlling a motor of a closure and/or blind in a vehicle body, the method comprising:
   determining a reference state signal comprising measurements of at least one of a speed of a rotor of said motor and a current supplied to said rotor;
   repeatedly estimating motor model parameters of said motor;
   determining an estimated state signal based on an input signal comprising measurements or estimates of a voltage supplied to said rotor, said estimated motor model parameters, said reference state signal and an error signal, said error signal representing a difference between said reference state signal and said estimated state signal;
   determining a disturbance observer signal from said error signal;
   computing a first derivative of said disturbance observer signal at a present moment;
   detecting an undesired obstruction in the path of said closure and/or blind driven by said motor if said first derivative of said disturbance observer signal exceeds a threshold; and
   reversing said rotor of said motor upon detecting said obstruction.

18. The non-transitory computer readable medium as claimed in claim 17, wherein determining said disturbance observer signal from said error signal and computing said first derivative of said disturbance observer signal at said present moment comprises:
   determining a first disturbance observer signal from said error signal; —determining a second disturbance observer signal from said first disturbance observer signal by applying one or more filters, said one or more filters attenuating or rejecting signals with a frequency below a first frequency or above a second frequency; and
   computing said first derivative of said second disturbance observer signal at said present moment.

19. The non-transitory computer readable medium as claimed in claim 17, wherein determining said estimated state signal based on said input signal, said estimated motor model parameters, said reference state signal and said error signal comprises:
   determining a second error signal from a first error signal by applying a low-pass filter, said first and second error signals each representing a difference between said reference state signal and said estimated state signal; and
   determining said estimated state signal based on said input signal, said estimated motor model parameters, said reference state signal and said second error signal, said low-pass filter attenuating or rejecting signals with a frequency above a certain frequency.

* * * * *